US007864740B2

(12) United States Patent
Yang et al.

(10) Patent No.: US 7,864,740 B2
(45) Date of Patent: Jan. 4, 2011

(54) SYSTEM FOR MINIMIZING SIGNALING OVERHEAD IN OFDMA-BASED COMMUNICATION SYSTEMS

(75) Inventors: Yunsong Yang, San Diego, CA (US); Anthony C. K. Soong, Plano, TX (US); Jianmin Lu, San Diego, CA (US); Jung Woon Lee, Allen, TX (US)

(73) Assignee: FutureWei Technologies, Inc., Plano, TX (US)

( * ) Notice: Subject to any disclaimer, the term of this patent is extended or adjusted under 35 U.S.C. 154(b) by 949 days.

(21) Appl. No.: 11/685,079

(22) Filed: Mar. 12, 2007

(65) Prior Publication Data

US 2007/0217370 A1    Sep. 20, 2007

Related U.S. Application Data

(60) Provisional application No. 60/783,609, filed on Mar. 17, 2006.

(51) Int. Cl.
*H04J 3/00* (2006.01)
(52) U.S. Cl. ...................... 370/337; 370/329; 370/335; 370/349

(58) Field of Classification Search .................. 370/329, 370/335, 337; 455/450
See application file for complete search history.

(56) References Cited

U.S. PATENT DOCUMENTS

| | | | |
|---|---|---|---|
| 7,031,281 B1* | 4/2006 | Zhang | 370/335 |
| 2002/0012334 A1* | 1/2002 | Strawczynski et al. | 370/337 |
| 2004/0071120 A1* | 4/2004 | Grech | 370/338 |
| 2005/0135291 A1* | 6/2005 | Ketchum et al. | 370/319 |
| 2005/0237994 A1* | 10/2005 | Fong et al. | 370/349 |
| 2007/0211658 A1* | 9/2007 | Gorokhov et al. | 370/329 |
| 2007/0211667 A1* | 9/2007 | Agrawal et al. | 370/335 |
| 2007/0214400 A1* | 9/2007 | Smith et al. | 714/748 |

\* cited by examiner

*Primary Examiner*—Kent Chang
*Assistant Examiner*—Dinh P Nguyen
(74) *Attorney, Agent, or Firm*—Slater & Matsil, L.L.P.

(57) ABSTRACT

A system of physical layer packet format and signaling methods is disclosed, wherein signaling overhead is minimized in applications where multiple users share air interface resources; improving efficiency in orthogonal frequency division multiplexing (OFDM) and orthogonal frequency division multiple access (OFDMA) communication systems.

10 Claims, 3 Drawing Sheets

SYSTEM FOR MINIMIZING SIGNALING OVERHEAD IN OFDMA-BASED COMMUNICATION SYSTEMS

PRIORITY CLAIM AND CROSS REFERENCE TO RELATED APPLICATION

This application is related to, and claims priority from, U.S. Provisional Application Ser. No. 60/783,609, filed on Mar. 17, 2006, Entitled "Method and System for Minimizing Signaling Overhead in OFDMA-based Communication Systems." The above-identified related application is hereby incorporated by reference for all purposes.

TECHNICAL FIELD OF THE INVENTION

The present invention relates generally to wireless communications systems, and more particularly, to a versatile system for physical layer packet formatting and signaling that minimizes signaling overhead and improves efficiency in orthogonal frequency division multiplexing (OFDM) and orthogonal frequency division multiple access (OFDMA) based communication systems.

BACKGROUND OF THE INVENTION

In a wireless multiple access communication system, the wireless traffic channel resource, e.g., bandwidth and time interval, is shared by all the wireless terminals, i.e., mobile units, in a particular cell. Efficient allocation of this traffic channel resource is very important, as it directly impacts the utilization of the traffic channel resource and the quality of service perceived by individual wireless terminal users. One such wireless communications system is the Orthogonal Frequency Division Multiplexing (OFDM) based Multiple Access system.

OFDM represents a different system design approach. It can be considered a combination of modulation and multiple access schemes that segment a communications channel in such a way that many users can share it. Whereas TDMA segments according to time and CDMA segments according to spreading codes, OFDM segments according to frequency. It is a technique that divides the spectrum into a number of equally spaced tones, and carries a portion of a user's information on each tone. OFDM can be viewed as one form of frequency division multiplexing (FDM). However, OFDM has an important special property, in that each tone is orthogonal with every other tone. FDM typically requires frequency guard bands between the frequencies, so that they do not interfere with each other. OFDM allows the spectrum of each tone to overlap, and since they are orthogonal, they do not interfere with each other. By allowing the tones to overlap, the overall amount of spectrum occupied is reduced.

OFDM can also be considered a multiple access technique, since an individual tone or groups of tones can be assigned to different users. Multiple users share a given bandwidth in this manner, yielding orthogonal frequency division multiple access, or OFDMA. Each user may be assigned a predetermined number of tones when they have information to send, or alternatively, a user can be assigned a variable number of tones based on the amount of information they have to send. Assignments are controlled by the media access control (MAC) layer, which schedules the resource assignments based on user demand.

In a wideband wireless communications system, signal may decrease from frequency selective fading, due to multipath transmissions. Conventional OFDM systems have proposed overcoming frequency selective fading by dividing total bandwidth into a plurality of subcarriers, such that the bandwidth on each subcarrier is sufficiently narrow to enable the data modulation symbols carried by that subcarrier to experience relatively flat fading.

OFDMA systems commonly use an OFDM modulation technique to multiplex the data traffic of a plurality of mobile stations, in both frequency and time. In a cellular communication network based on OFDMA, a base station communicates with mobile stations that are within its coverage area by using signals that are orthogonal in frequency, thereby eliminating intra-cell interference.

For a multi-carrier (OFDM) system, the transmission resource is the frequency-time block. To support hybrid automatic request (HARQ)—and advanced re-transmission strategy that allows for retransmissions directly at the physical/MAC layer, without involving higher layer mechanisms and inducing delay—the time line may be divided into several intervals, and the transmission of one packet may occupy only one interval. In addition, frequency allocation normally consists of a group of subcarriers.

Utilizing the concept of a channel tree, transmission granularity may be considered as a base node. Transmission granularity refers to the size of objects transmitted and received as a unit. For example, packet networks send and receive data in packets. Even if only some of the bits of a packet are erased or corrupted, the whole packet is discarded and mechanisms (e.g., forward error correction, request for resend) are activated to recover the packet as a whole.

Thus, such objects are either received error-free or are erased in their entirety. In some applications, an object's size could be the size of the transmission packets or could be smaller. In a channel tree, a parent node may have a set of child nodes. The relationships between the children and parent nodes do not overlap. It is understood that much larger resource allocation is possible with a higher layer tree node.

To reduce assignment signaling overhead, a system may use "synchronous HARQ" and provide support for "sticky" assignments. With synchronous HARQ, resources for successive retransmissions are not independently scheduled, but rather are retained for all re-transmissions associated with a packet. Thus, assignment of a set of hop-ports applies to an interval (or "interlace"). Assignments on different interlaces are independent, and an AT may be given resources on multiple interlaces.

Assignments can be sticky or non-sticky. Sticky assignments are useful to reduce assignment overhead required when it is beneficial to schedule multiple users simultaneously, and to eliminate request latency for RL transmissions. When an assignment is non-sticky, the assignment expires on successful packet decode, or when the packet fails to decode after the maximum number of H-ARQ retransmissions allowed for the packet. When assignments are sticky, the assignment persists as long as the assigned resource is in use. An assignment is in use as long as either a packet or an erasure sequence is transmitted using the assignment. The erasure sequence is simply a one-bit "keep alive" indication used to inform the receiver that the assignment should be retained even though a data packet might not be available for transmission using the assignment. If neither a packet nor an erasure sequence is transmitted using the assignment, the assignment expires and the resources are free for subsequent allocation. In addition, it is possible for the AP to send an explicit message that ends an assignment.

To reduce overhead required to specify sets of hop ports in a system, a finite space of channel IDs are defined that map to specific sets of hop ports, and are used to communicate assignments to ATs. Because assignments can be sticky, and to combat fragmentation of resources in the system due to the finite mapping of channel IDs, the system supports supplemental assignments that add sets of hop ports to the existing set allocated to an AT for an interlace. Such supplemental assignments are sent to augment an AT's allocation between packet transmissions.

The mapping between channel IDs and hop-ports is defined using the channel tree (as mentioned above), such as the one illustrated in FIG. 1. Each node on the tree is given a unique channel ID. For example, in FIG. 1, the channel tree shows that there are 32 base nodes in the system, namely $L_{31}^{64}, L_{32}^{64}, \ldots,$ and $L_{62}^{64}$, wherein the superscript denotes a specific node layer and the subscript denotes a specific node ID. As a further example one can see that node $L_{15}^{32}$ consists of base node $L_{31}^{64}$ and $L_{32}^{64}$ and thus can be used to transmit larger traffic. Further, each base node (nodes at the bottom of the tree) is mapped to a set of hop ports. A channel ID then maps to the set of hop ports mapped by the base nodes under the node of the channel ID.

Generally speaking, there are two kinds of resource assignments: sticky and non sticky. In order to make the communication between base stations and terminals more efficient, a concept of sticky assignments is illustrated. Sticky assignments are useful in a scheduled data transmission system in cases where many users are competing for limited assignment message resources. A sticky assignment is when a resource (e.g., a channel) that is assigned to a particular user continues to be available to that user after the standard unit of transmission (e.g., packet) is completed. Thus, a new assignment message is not necessary to enable that user to continue transmission.

When an assignment is sticky, the assignment persists as long as the assigned resource is in use. In terms of reducing signaling overhead, sticky assignments are useful for the long standing and non-bursty traffic, such as VOIP. However, it is likely that the resource assignment granularity is larger than one traffic loading. In this case, it is helpful to share the same resource with several users or traffics. When an assignment is non-sticky, the assignment expires on the end this packet transmission.

Thus, significant signaling overhead is present in OFDMA systems. Receiving terminals need to know which sub-carriers are assigned to them; and this affects the system's performance. Sub-carrier attenuations may be correlated over time, so few assignments change from one down-link phase to the next.

Therefore, there is a need for structures and methods that allow multiple users to share air interface resources, including physical layer packet formats and signaling methods that optimize overall system performance.

SUMMARY OF THE INVENTION

The present invention discloses novel methods and constructs whereby multiple users efficiently share air interface resources, by providing embodiments of physical layer packet format and signaling methods wherein multiple users may share air interface resources, thereby optimizing overall system efficiency.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a unique method and system for minimizing signaling overhead by way of a multi-user packet (MUP) by sharing air interface resources for improvement of efficiency in OFDMA-based communication systems. For VOIP applications, voice frames have to be placed into IP packets. The added protocol overhead represents an intolerable amount of spectral inefficiency for wireless mobile networks. The present invention addresses the minimization of such overhead.

According to the present invention, the physical layer packet format and an associated signaling method are disclosed. With this method, multiple users can share the same air interface resource, resulting in improved and increased system efficiency.

In a wireless environment, an access network (AN) (not shown) assigns a group of access terminals (AT) (not shown) with a channel node comprising at least one or a plurality of base nodes. Specifically, the access network (AN) assigns a short ID with each user as an alternative to a standard long identifier, which is usually larger than 10 bits. It should be understood that such an assignment of a short ID may or may not happen in one frame. That is, in some situations the assignment of the short ID may be a dynamic assignment. One example would be wherein the access network AN assigns five (5) users with a specific channel node such as $L_{7}^{16}$, wherein $L_{7}^{16}$ comprises base node $L_{31}^{64}, L_{32}^{64}, L_{33}^{64}$ and $L_{34}^{64}$. In such an example each user would be associated with a 3 bit ID ranging from 0 to 4.

Further in accordance with the present invention, in each available frame, the access network (AN) will schedule at least one user, wherein the AN aggregates the payloads together into a physical layer packet (PLP). It should be understood from the present invention regarding acknowledgement feedback that the number of scheduled users will be equal to or less than the number of base nodes. Specifically, in above example, the access network (AN) can schedule up to four (4) users at any particular time. Furthermore, to ensure that multiple users encounter similar receiving quality, it is preferred by the present invention to put the users of similar channel quality together to form a physical layer packet (PLP).

Figure 2:
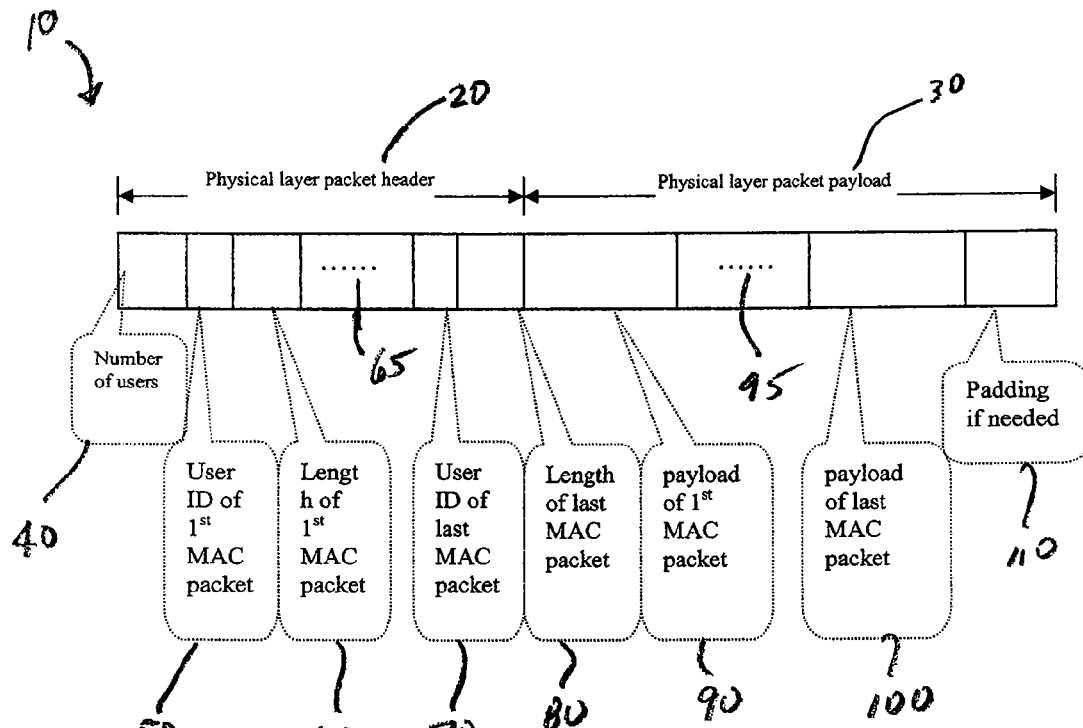
FIG. 2 depicts a representative embodiment of a physical layer packet (PLP) of a multi-user packet (MUP) in a wireless system according to the present invention.

With reference now to FIG. 2, the present invention discloses an implementation of a physical layer packet (PLP) 10 format comprising a physical layer packet header 20 and a physical layer packet payload 30. In the preferred embodiment of the invention described, a multi-user packet (MUP) is separated into at least a physical layer packet header section 20 and a physical layer packet data or payload section 30. The physical layer packet header section 20 contains information that assists the mobile station with detection of the multi-user packet (MUP). Consequently, as will be described further below, the header sections 20 can comprise such information as the MAC ID of the users 50 being serves by a specific multi-user packet (MUP) and where in the multi-user packet (MUP) the data for each user that is sent is residing.

Moreover, the size of the header section 20 is always known to the mobile station as it is entirely determined by the resource allocation communicated to the mobile station. The present invention utilizes a separate cyclic redundancy check (CRC) algorithm that is appended to the physical layer packet header section 20 and the physical layer packet data or payload section 30. The header section 20 and the data or payload section 30 are then encoded separately. The encoded bits of the multi-user packet (MUP) are then separated into sub-packets. The first sub-packet always contains the entire header section 20 and some or all of the encoded bits from the data or payload section 30. The location of the header section 20 in the first sub-packet is also known to the mobile station. For example, the header section 20 can always occupy the beginning of the sub-packet.

Given this, the mobile station always attempts to detect the header section 20 information. The mobile station is intelligent to know that the header section 20 is decoded correctly if the header CRC passes. If the mobile station detects the header section 20, then the mobile station knows that this is the first sub-packet of a new MUP. If the mobile station does not detect the header section 20, then the mobile station knows that this sub-packet is the continuation of an existing multi-user packet (MUP).

With continued reference to FIG. 2, the physical layer packet header 20 of the physical layer packet (PLP) 10 comprises the fields for the number of users 40 which denotes the number of user in a specific physical layer packet (PLP) 10. By way of example, if the maximum user number is 4, the number of users field 40 requires 2 bits.

In addition, the present invention's physical layer packet header 20 further comprises user header data, comprising a user ID 50 and the length 60 (i.e., the payload length) of the associated user ID's MAC packet 90 for the associated user ID 50. In sequenced repetition, additional user ID fields for further subsequent MAC packets and associated lengths of the subsequent MAC packet fields will repeat for the times of the number of users comprising the physical layer packet 10. The repeated/additional packet user IDs and length assignments are indicated in FIG. 2 by the ellipses 65 (i.e., . . . ) The user ID 50 and the length 60 of the MAC packet 90 have the fix length, for example, 2 bits for user ID and 10 bits for payload length. In addition, the physical layer packet header 20 further comprises the user ID 70 of the last MAC packet 100 and the length 80 of the last MAC packet 100 (i.e., the payload).

FIG. 2 further illustrates the physical layer packet payload (PLP) 30. The physical layer packet payload (PLP) 30, the payload of the first MAC packet 90 and the payload of the last MAC packet 100 are depicted. As mentioned above, such arrangement enables the position of each user's payload (e.g., 90 . . . 100) to be identified to the receiver to enable specific payload ownership determination. The payloads (e.g., 90 . . . 100) are sequentially placed in the same order as occurs in the physical layer packet header 20. It will be understood to one skilled in the art that in sequenced repetition, additional MAC packet lengths (i.e., the payload) will repeat for the times of the number of users comprised in the physical layer packet header 20 comprising the physical layer packet 10. The repeated/additional additional MAC packet lengths assignments are indicated in FIG. 2 by the ellipses 95 (i.e. . . . ). In addition, if the total length of the physical layer packet 10 is less than that required by the physical layer packet 10 (PLP), padding 110 may be inserted in the tail of the physical layer packet payload 30. It should be recognized by one skilled in the art that the positions of the described fields can be interexchanged without departing from the scope and spirit of the present invention.

By way of example, according to that just described above, if an access network (AN) schedules user IDs of 2, 0 and 4 together and the payload lengths of the user IDS are 70, 150 and 250 bits respectively, and the physical layer packet (PLP) 10 size is 520 bits, the fields will be filled as depicted below:

a) number of users: 3;
b) $1^{st}$ user ID: 2;
c) $1^{st}$ payload length: 70;
d) $2^{nd}$ user ID: 0;
e) $2^{nd}$ payload length: 150;
f) $3^{rd}$ user ID: 4;
g) $3^{rd}$ payload length: 250;
h) $1^{st}$ payload: user ID 2's data;
i) $2^{nd}$ payload: user ID 0's data;
j) $3^{rd}$ payload: user ID 4's data; and
k) padding: to fill the remaining vacant fields to form the completed 520-bit multiple user packet (MUP). For example, a 50-bit padding would be required in the present example to complete the 520-bit MUP.

Furthermore, and by way of further example, the present invention provides for alternative formats for the physical layer packet (PLP) to facilitate functionality similar to the embodiment described above. Specifically, one such alternative comprises a fixed number of user headers, thereby eliminating the number of users field 40 as described in association with FIG. 2 above. In the event that the number of users 40 is less than the number of user headers, the left field of the physical layer packet header 20 can be marked as reflecting "empty."

When traffic information is transmitted from a base station to a mobile station, the base station waits to receive a confirmation message from the mobile station indicating whether the mobile station has received the transmitted information without errors. If the mobile station receives the information correctly, it transmits an ACKnowledge (ACK) confirmation message. If the mobile station receives the information with errors or with an unacceptable amount of errors, it transmits back a Negative ACKnowledgement (NACK) message to the base station informing the base station that the information was received with errors. The base station retransmits the traffic information upon reception of a NACK confirmation message.

According to the present invention, when a potential user(s) has successfully decoded the physical layer packet (PLP) 10, the packet receiver transmits an ACK message to the sender over a reverse link channel called the Reverse ACKnowledgement Channel (RACKCH).

Figure 1:
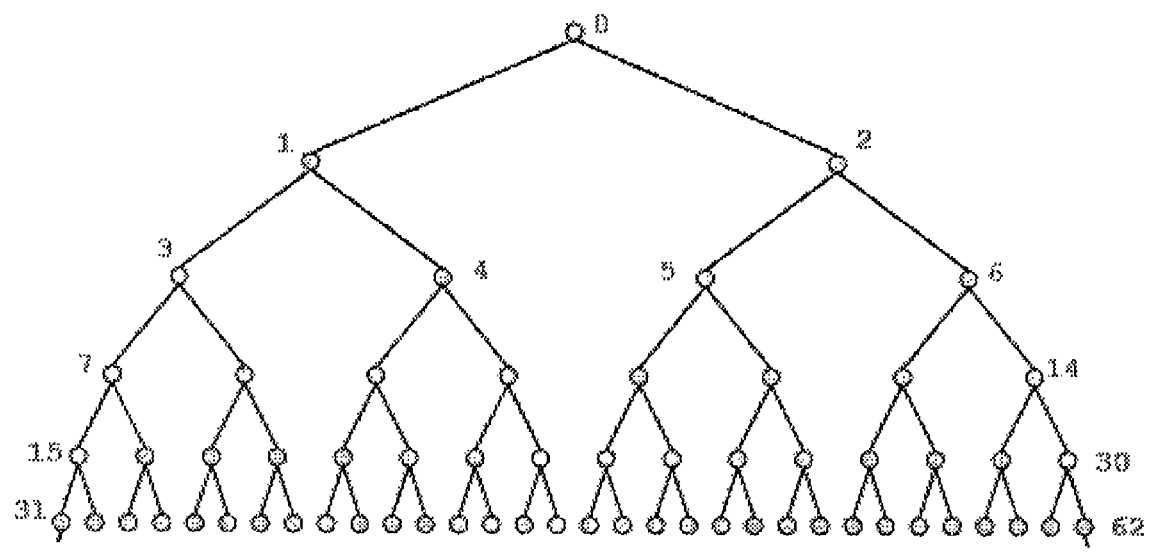
FIG. 1 depicts mapping between channel IDs and hop-ports using a channel tree structure.

According to the present invention the modulation scheme used on the reverse ACKnowledgement channel is on-off keying (OOK). Typically, a RACKCH ID is associated with a forward link base node. For example, a RACKCH ID of 1 is associated with FL base node $L_{31}^{64}$ (refer to FIG. 1 for reference to $L_{31}^{64}$), a RACKCH ID of 2 is associated with FL base node $L_{32}^{64}$ (refer to FIG. 1 for reference to $L_{32}^{64}$), etc., until a RACKCH ID of 32 is associated with FL base node $L_{62}^{64}$ (refer to FIG. 1 for reference to $L_{62}^{64}$). Because the multi-user packet (MUP) occupies the channel node $L_{7}^{16}$, the RACKCH IDs related are 1, 2, 3, and 4.

Furthermore, if there are multiple user data in the physical layer packet (PLP) 10, the RACKCH ID is associated with the particular user through one to one mapping. Such mapping can be established by various methods. By way of a non-limiting example, the mapping is established by the sequence of the user existing in the physical layer packet (PLP) 10. In the above example, a user ID of 2 is the first user ID in the PLP. Therefore, it will respond to the ACK through the RACKCH ID of 1. Similarly, a user ID of 0 is the second user ID in the PLP, so it is associated with the RACKCH ID of 2. In like manner, a user ID of 4 is the third user ID in the PLP, so it is associated with a RACKCH ID of 3. In situations where only one user exists in the PLP, the access terminal (AT) will always use the lowest indexed RACKCH associated with the assigned Node ID to transmit the necessary feedback.

If the access network (AN) did not receive in entirety the acknowledgement from the user IDs included in the PLP and the maximum retransmission times is not reached, the access network (AN) will retransmit the PLP in the next interlace. Otherwise, the access network (AN) will schedule a new PLP in the next interlace.

The retransmission of the PLP described above can be a simply repeat of the prior PLP and in such a case, it is likely for the access terminal (AT) receiving the duplicated packet. It should be understood by one skilled in the art that the duplication detection can be done in a higher layer.

In an alternative method according to the present invention, the access terminal (AN) transmits the PLP for a fixed number of interlaces. In such a situation the access terminal (AN) does not need the acknowledgement from the access terminal (AT). In this alternative method, the access network (AN) will notify the timeline when a new PLP begins by signaling to each potential access terminal (AT).

It yet another alternative method, the access network (AN) signals each potential user with the time when the new PLP begins. If the packet is not new and has not been decoded successfully, the potential user will try to decode it with the stored information of the prior interlaces since the last new PLP.

According to another embodiment of the present invention, it is often desirable to indicate to a mobile station when a new multi-user packet (MUP) is being transmitted from the base station to the mobile station. In one embodiment, the base station indicates to the mobile station that the base station is actively sending a new multi-user packet (MUP) to the mobile station. As previously stated, the multi-user packet (MUP) is sent to the mobile station in a plurality of sub-packets.

Figure 4:
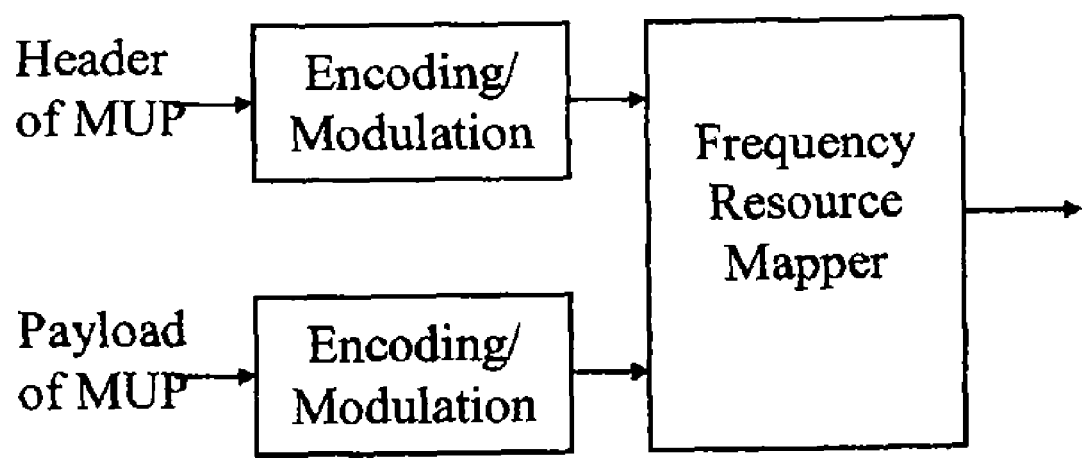

With reference to FIG. 4 what is graphically shown is that the header and payload parts of the multi-user packet (MUP) are separately encoded, modulated and multiplexed to its frequency resource according to the present invention.

Figure 3:
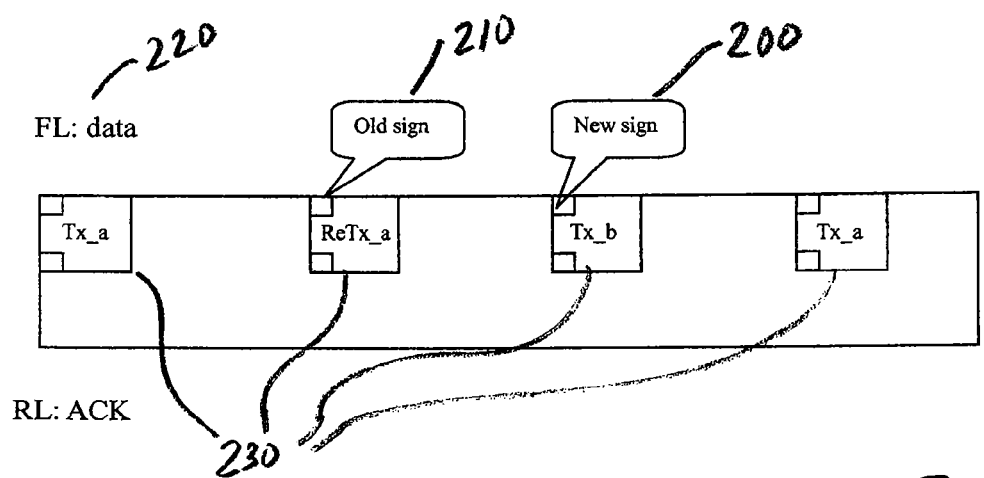
FIG. 3 depicts a representative embodiment of a traffic channel in wireless system utilizing the implementation of a New or old sign, according to the present invention; and, FIG. 4 graphically depicts a method for transmitting a multi-user packet wherein the header and payload parts of the multi-user packet (MUP) are separately encoded, modulated and multiplexed to the frequency resource, in accordance with the present invention.

Now with reference to FIG. 3, what is depicted is yet another implementation wherein the access network (AN) signals each potential user with the time when the new PLP begins by placing a New sign 200 or an Old sign 210 in the traffic channel. As FIG. 3 depicts, at the first subcarrier of the first symbol of each traffic frame 230, a New sign 200 or an Old sign 210 is binary phase shift keying (BPSK) modulated, such that "+1" reflects the new data packet and a "−1" reflects the retransmitted data packet. The New sign 200 or the Old sign 210 is transmitted with a target performance at 0.1% bit error rate (BER). If a sign can not achieve the desired accuracy, a plurality of modulated symbols can be placed to reach the desired 0.1% BER accuracy. For example, FIG. 3 depicts that there is another sign at the last subcarrier of the first symbol.

Another embodiment and implementation wherein the access network (AN) signals each potential user with the time when the new PLP begins by the access network (AN) is disclosed. Specifically, the access network (AN) places a New sign or an Old sign in the FL control channel in every frame. Each potential user listens to the FL control channel in the frame to determine if it is a New sign or an Old sign. If the sign denoting it is a new packet (i.e., New sign), the access terminal (AT) subsequently initiates a new decoding procedure. Otherwise, the access terminal (AT) regards that specific frame as retransmission and will try to decode it by a type of incremental redundancy scheme or chase combining scheme. The position of the New sign or Old sign in the FL control channel is notified to each potential user when a call is established.

Further, according to the present invention, it will be understood by one skilled in the art that this method can also be applied for a single user ID packet. If it is mandatory that only one user ID exist in the physical layer packet (PLP) 10 (See FIG. 2), then the access terminal (AT) addressing scheme is provided selective alternatives. For example, one alternative is that the access network (AN) assigns a particular scrambling code to each user ID. At a frame, the access network (AN) schedules a user ID and scrambles the PLP with its particular code. Therefore, only the target access terminal (AT) is able to decode and acknowledge as described above. In this case, there is no need for the user ID field 50 (See FIG. 2) in the PLP 10 format.

In yet another embodiment of the invention, an indicator, called the new multi-user packet (MUP) indicator, is always sent with every sub-packet to inform the mobile station if this is a continuation of the existing MUP or a new MUP. In order to simplify the detection hardware in the mobile station, the location of this indicator in the frame that carriers the sub-packet remains fixed. In this way, the mobile stations begin the detection of the sub-packet by first detecting the new MUP indicator to determine if this sub-packet is a continuation of an existing MUP or a new MUP.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of allocating transmission resources in a wireless communications system, the method comprising the steps of:

providing a physical layer packet format data;
providing the physical layer packet format data to a communication station via a traffic channel;
providing an access network;
utilizing the access network to assign a plurality of access terminals with a single channel node having at least one base node;
utilizing the access network to assign a short ID to each access terminal of the plurality of access terminals, wherein the assignment is dynamic;
utilizing the access network to schedule at least one access terminal, and a payload for the at least one access terminal into a physical layer packet; and
transmitting the physical layer packet in a first interlace to the scheduled at least one access terminal, wherein the access network signals the plurality of access terminals a timing information of a new second interlace, and wherein the timing information is placed in a first sub-carrier of a first symbol of each traffic frame.

2. The method of claim 1, wherein the step of utilizing the access network to assign a short ID further comprises assigning a short ID that may be transferred over one or more frames.

3. The method of claim 1, wherein a number of scheduled access terminals is equal to or less than a number of base nodes.

4. The method of claim 3, wherein the traffic data for the scheduled access terminals in the physical layer packet have similar channel quality.

5. The method of claim 1, wherein the physical layer packet comprises a physical layer packet header and a physical layer packet payload.

6. The method of claim 5, wherein the physical layer packet header comprises fields for the number of access terminals being scheduled in the physical layer packet, and a payload length, wherein the fields for each access terminal being scheduled is sequentially listed.

7. The method of claim 6, wherein the payloads for each of the access terminals being scheduled are sequentially placed in the physical layer packet payload in the same order as in the physical layer packet header.

8. The method of claim 5, wherein the physical layer packet header comprises a fixed number of fields, and wherein empty fields in the physical layer packet header are marked.

9. The method of claim 1, further comprising:
retransmitting the physical layer packet in the second interlace adjacent the first interlace unless an acknowledgement message from the scheduled access terminals is received; and
transmitting a new physical layer packet in the second interlace if an acknowledgement message from the scheduled access terminals is received.

10. A method of allocating transmission resources in a wireless communications system, the method comprising the steps of:
providing a physical layer packet format data;
providing the physical layer packet format data to a communication station via a traffic channel;
providing an access network,
utilizing the access network to assign a plurality of access terminals with a single channel node having at least one base node;
utilizing the access network to assign a short ID to each access terminal of the plurality of access terminals, wherein the assignment is dynamic;
utilizing the access network to schedule at least one access terminal, and a payload for the at least one access terminal into a physical layer packet; and
transmitting the physical layer packet in a first interlace to the scheduled at least one access terminal, wherein the access network signals the plurality of access terminals a timing information of a new second interlace, and wherein the timing information is placed in a last sub-carrier of a first symbol of each traffic frame.

* * * * *